US012625776B2

(12) United States Patent
Sogabe

(10) Patent No.: US 12,625,776 B2
(45) Date of Patent: May 12, 2026

(54) MAGNETIC DISK DRIVE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Keigo Sogabe, Chigasaki (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/786,214

(22) Filed: Jul. 26, 2024

(65) Prior Publication Data

US 2025/0298698 A1    Sep. 25, 2025

(30) Foreign Application Priority Data

Mar. 22, 2024    (JP) ................................. 2024-046340

(51) Int. Cl.
    *G06F 11/14*        (2026.01)
    *G06F 11/1446*      (2026.01)
    *G11B 19/04*        (2006.01)
(52) U.S. Cl.
    CPC ........ *G06F 11/1458* (2013.01); *G11B 19/047* (2013.01); *G06F 2201/81* (2013.01)
(58) Field of Classification Search
    CPC ............. G06F 11/1458; G06F 2201/81; G06F 3/0679; G11B 19/047
    See application file for complete search history.

(56) References Cited

U.S. PATENT DOCUMENTS

| | | | |
|---|---|---|---|
| 2009/0034340 A1* | 2/2009 | Misumi ................... | G06F 13/16 |
| | | | 365/189.16 |
| 2014/0173268 A1 | 6/2014 | Hashimoto | |
| 2015/0363285 A1 | 12/2015 | Delaney et al. | |
| 2018/0267827 A1 | 9/2018 | Kanno | |
| 2019/0286208 A1* | 9/2019 | Sogabe ............... | G06F 11/3058 |
| 2020/0293209 A1 | 9/2020 | Ito | |
| 2023/0092423 A1 | 3/2023 | Koyama | |
| 2023/0221875 A1* | 7/2023 | Moon ................... | G06F 11/073 |
| | | | 711/112 |
| 2023/0305699 A1* | 9/2023 | Shah ...................... | G06F 3/0604 |
| 2023/0305758 A1 | 9/2023 | Sogabe | |
| 2023/0401002 A1* | 12/2023 | Lee ........................ | G06F 3/0679 |
| 2024/0069741 A1* | 2/2024 | Esposito ............. | G06F 12/0292 |

FOREIGN PATENT DOCUMENTS

| | | |
|---|---|---|
| JP | 2013-047913 A | 3/2013 |
| JP | 2018-156131 A | 10/2018 |
| JP | 2020-149495 A | 9/2020 |

* cited by examiner

*Primary Examiner* — Michael Maskulinski
*Assistant Examiner* — Xinyuan Yu
(74) *Attorney, Agent, or Firm* — Knobbe, Martens, Olson & Bear, LLP

(57) ABSTRACT

According to one embodiment, a magnetic disk drive includes a flash memory adopting a Serial NAND that includes a plurality of Blocks. The magnetic disk drive determines one or more first Blocks to be used for write at backup, among the plurality of Blocks, based on a write time per the Block in the Serial NAND. The magnetic disk drive backs up data in a nonvolatile memory to the Serial NAND using a counter electromotive force of a spindle motor.

8 Claims, 9 Drawing Sheets

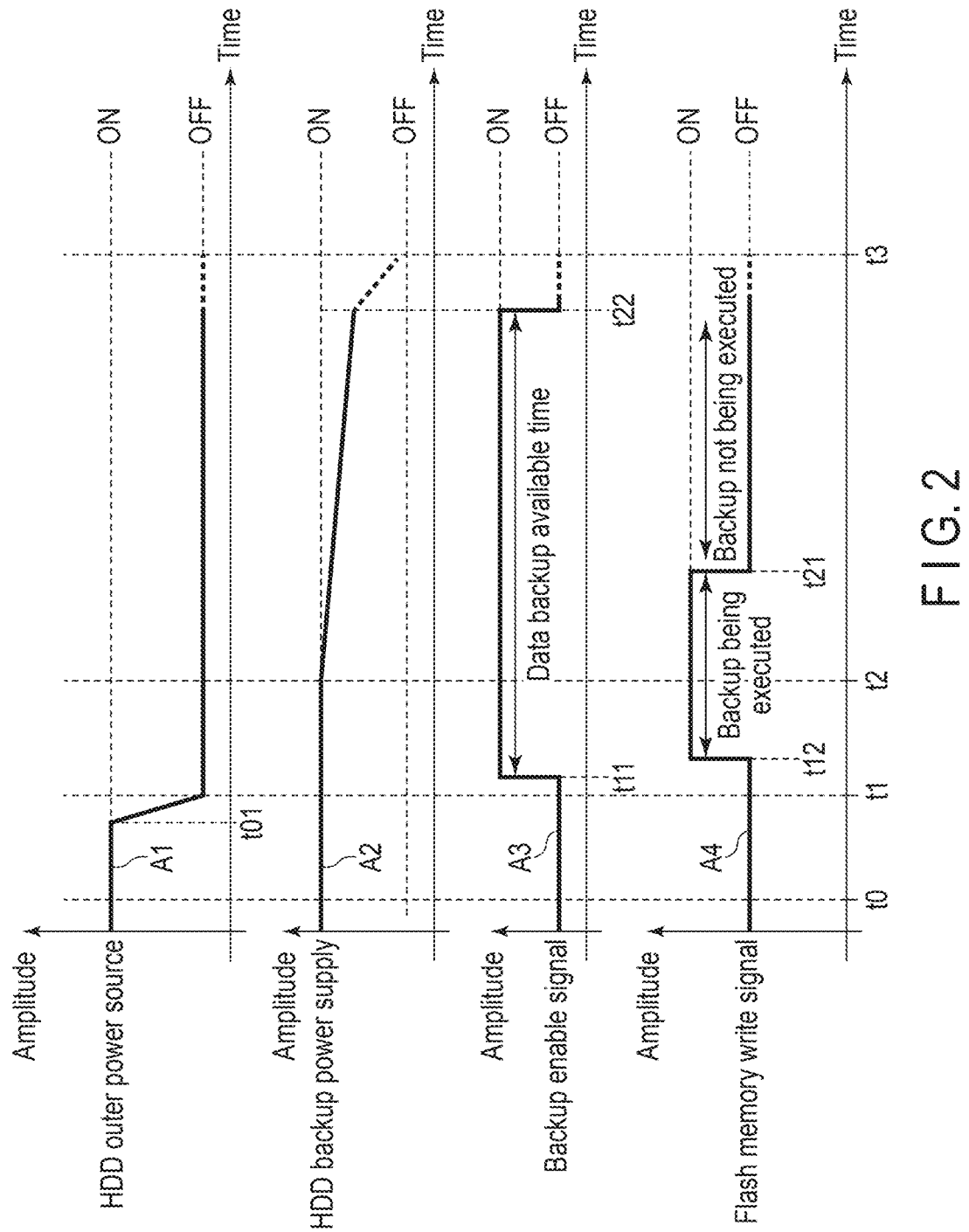
F I G. 2

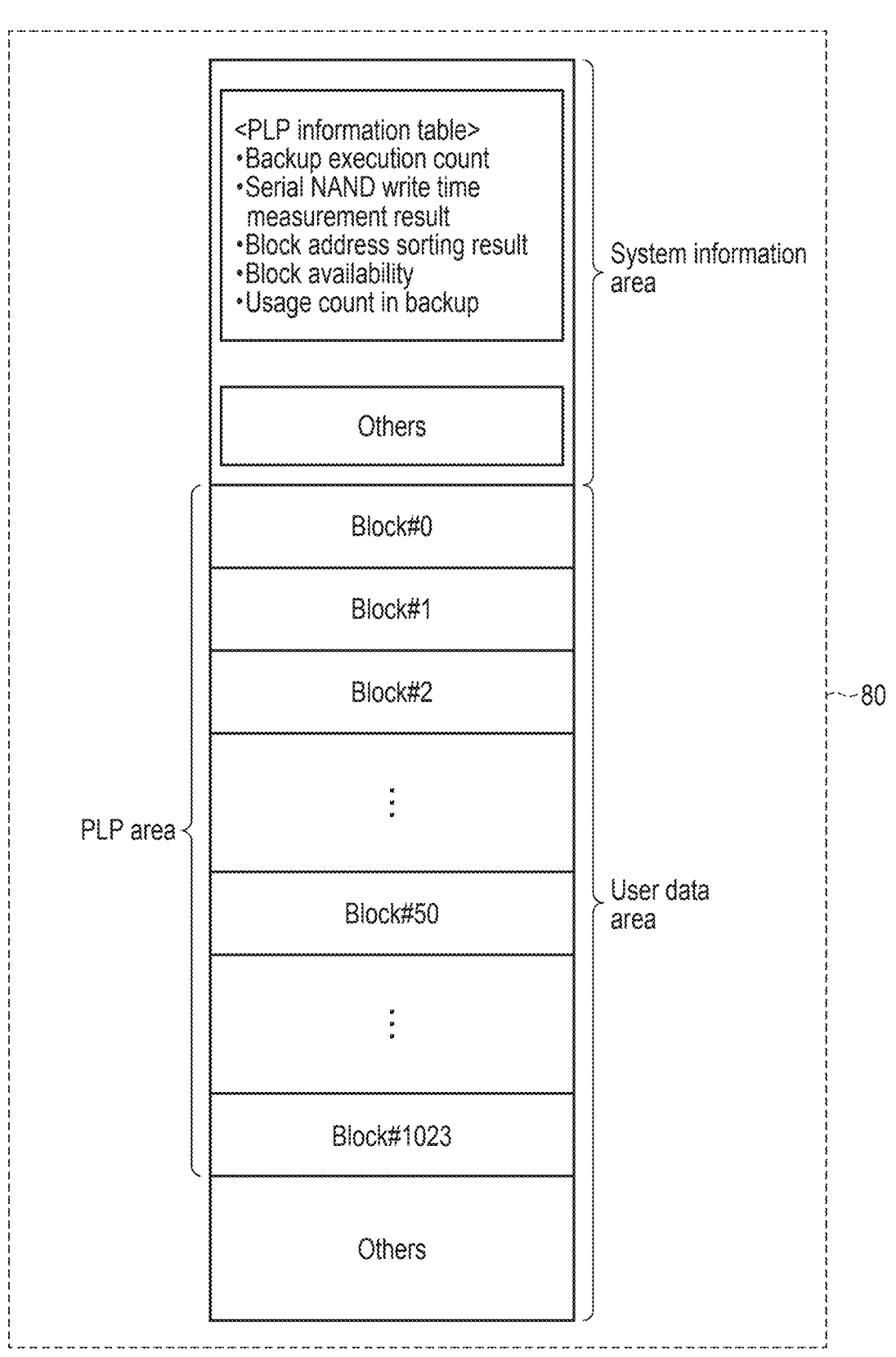
F I G . 3

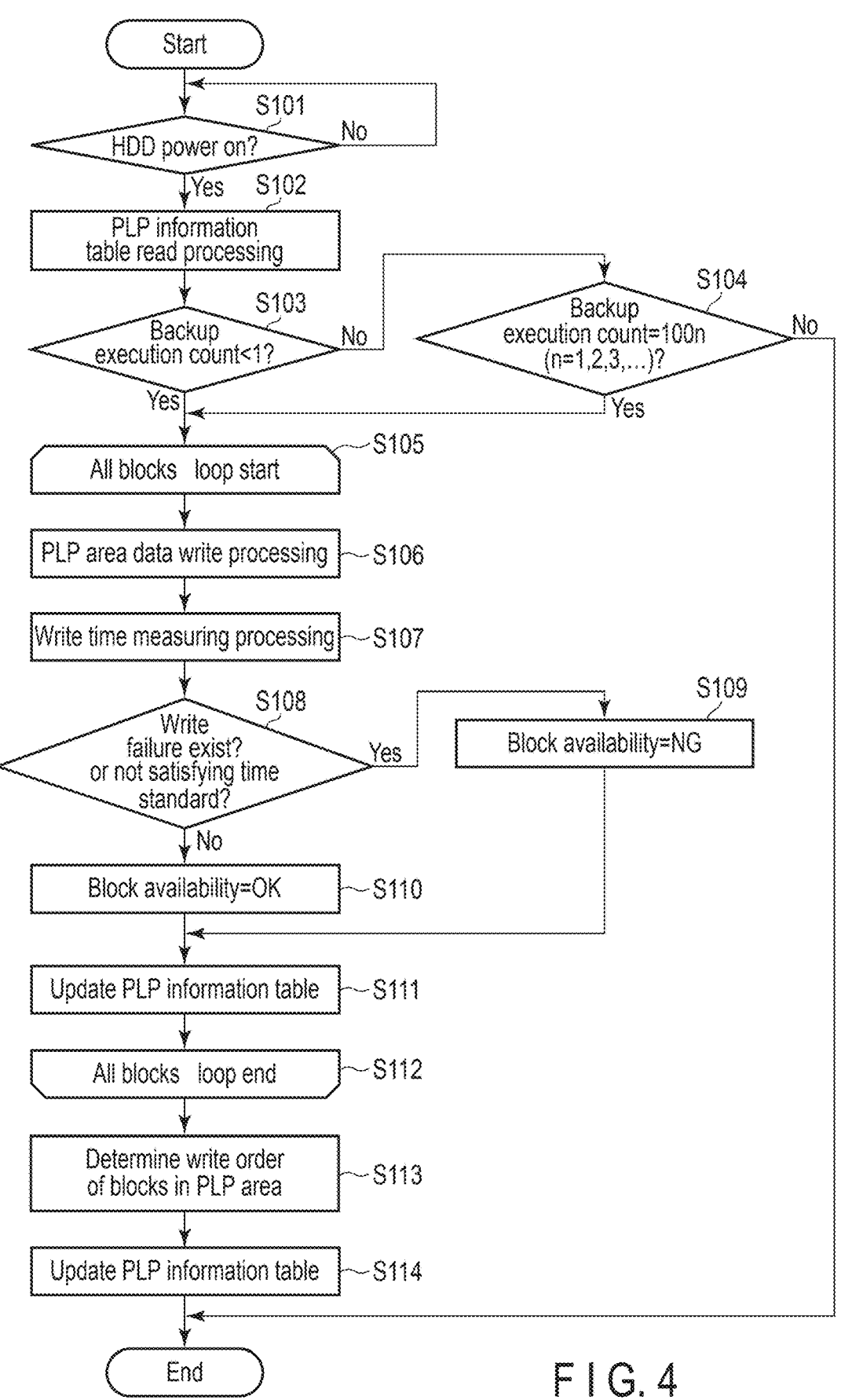
F I G. 4

PLP information table
(With no backup execution count)

| Original block address | Backup execution count | Serial NAND write time | Write address sort | Block availability | Usage count in backup |
|---|---|---|---|---|---|
| Block#0 | | c[ms] | 3 | OK | 0 |
| Block#1 | | d[ms] | 5 | OK | 0 |
| Block#2 | | a[ms] | 1 | OK | 0 |
| Block#3 | 0 | c[ms] | 4 | OK | 0 |
| Block#4 | | b[ms] | 2 | OK | 0 |
| Block#5 | | f[ms] | - | NG (Not satisfying write time) | 0 |
| Block#6 | | e[ms] | 6 | OK | 0 |
| Block#7 | | - | - | NG (Write failure) | 0 |
| ..... | | ..... | ..... | ..... | ..... |

D1    D2    D3    D4    D5    D6

BD1    BD2    BD3 a<b<c<d<e<f<....
(Ascending order in write time)

F I G. 5A

| Original block address | Backup execution count | Serial NAND write time | Write address sort | Block availability | Usage count in backup |
|---|---|---|---|---|---|
| | | | PLP information table (With backup execution count) | | |
| Block#0 | | b[ms] | 2 | OK | 150 |
| Block#1 | | e[ms] | 6 | OK | 300 |
| Block#2 | | a[ms] | 1 | OK | 200 |
| Block#3 | 500 | c[ms] | 3 | OK | 250 |
| Block#4 | | d[ms] | 4 | OK | 300 |
| Block#5 | | - | - | NG (Not satisfying write time) | 0 |
| Block#6 | | e[ms] | 5 | OK | 250 |
| Block#7 | | - | - | NG (Write failure) | 0 |
| ..... | | ..... | ..... | ..... | ..... | a<b<c<d<e<f<...
(Ascending order in write time)

BD11    BD12

D1    D2    D3    D4    D5    D6

F I G. 5B

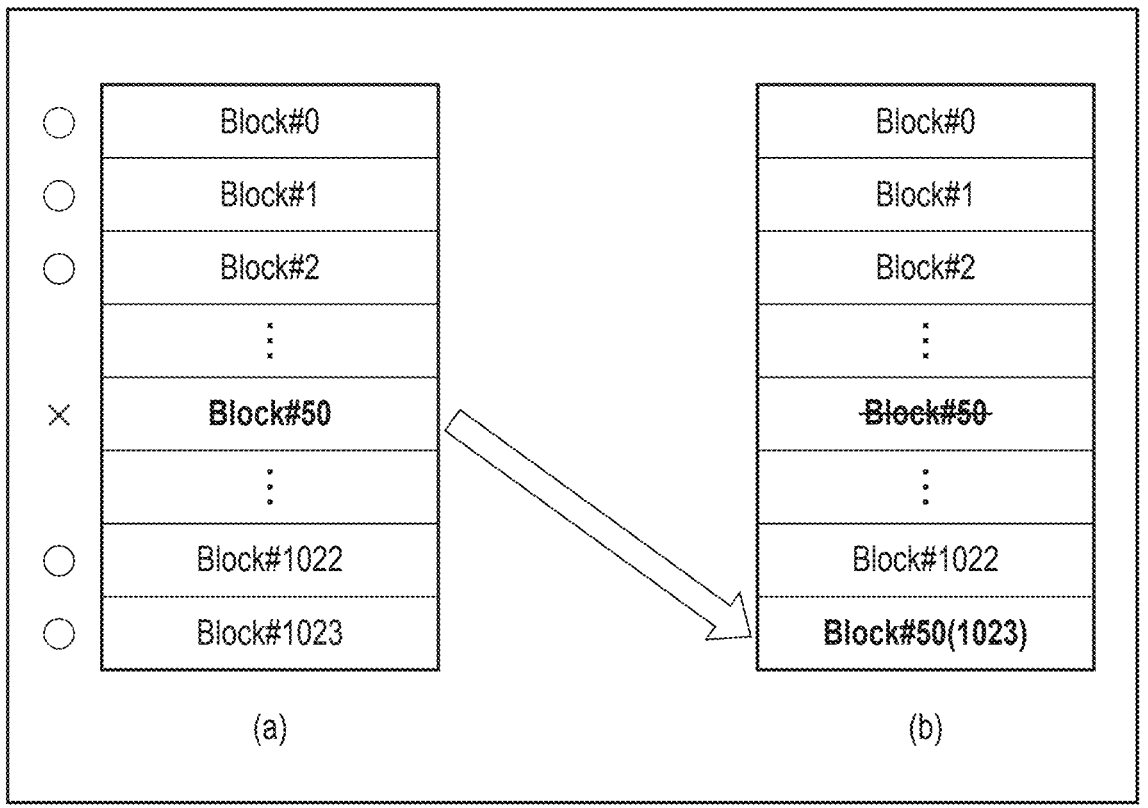
(a)            (b)
F I G. 7

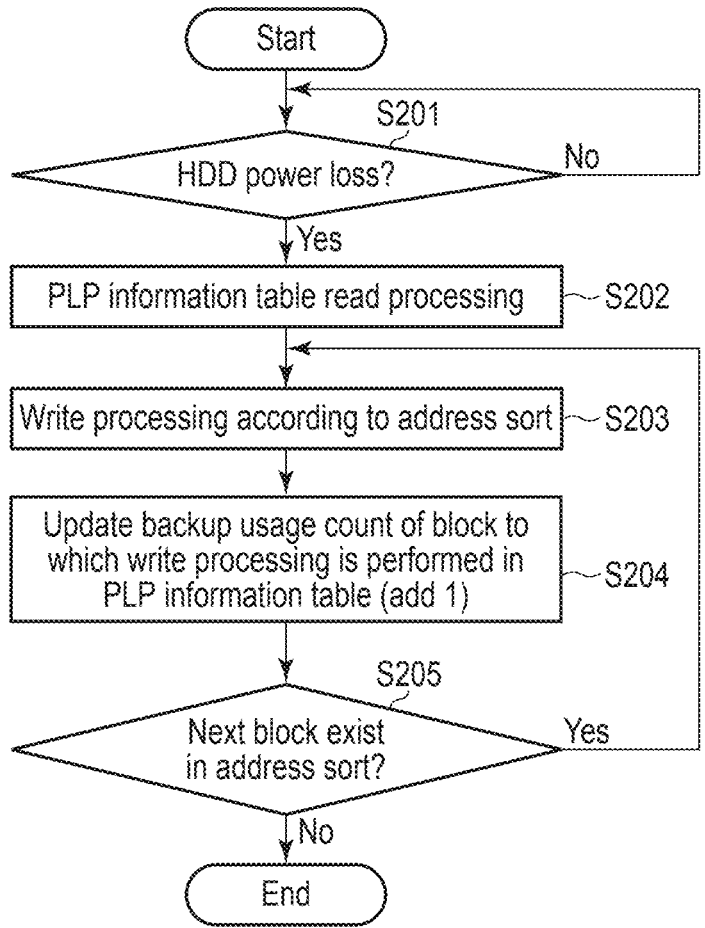
F I G. 8

MAGNETIC DISK DRIVE

CROSS-REFERENCE TO RELATED APPLICATIONS

This application is based upon and claims the benefit of priority from Japanese Patent Application No. 2024-046340, filed Mar. 22, 2024, the entire contents of which are incorporated herein by reference.

FIELD

Embodiments described herein relate generally to backup data processing in a magnetic disk drive.

BACKGROUND

The magnetic disk drive comprises Power Loss Protection (PLP) function as a technique to back up cache data, which is stored in a volatile memory, in a nonvolatile memory at the time of a power loss. Nonvolatile memories used for the PLP function have adopted a Serial NOR as a flash memory.

The Serial NOR involves long data write time. Thus, sufficient amount of data may not be backed up. That is, backup data size is not maintained in some cases. By adopting a Serial NAND enabling large-capacity/high speed access, improvement in HDD performance such as increase in backup data size can be expected. However, products using the Serial NAND may generate Blocks involving write failure (Bad Blocks) and may decrease the backup data size at the time of activating the PLP.

The present embodiment provides a magnetic disk drive comprising a PLP function to back up data to a flash memory adopting the Serial NAND.

BRIEF DESCRIPTION OF THE DRAWINGS

FIG. 2 is a timing chart illustrating operations of a PLP function of the magnetic disk drive of the present embodiment.

FIG. 3 is a schematic view illustrating data configuration of a nonvolatile memory (Serial NAND) in the magnetic disk drive of the present embodiment.

FIG. 4 is a flowchart showing processing operations in the magnetic disk drive of the present embodiment.

FIG. 5A shows an example of a PLP information table of the Serial NAND included in the magnetic disk drive of the present embodiment in a case where a backup execution count is 0.

FIG. 5B shows an example of the PLP information table of the Serial NAND included in the magnetic disk drive of the present embodiment in a case where the backup has been executed.

FIG. 7 is a schematic view illustrating the Serial NAND in a case where NG occurs in write into Blocks in the Serial NAND in the magnetic disk drive of the present embodiment.

FIG. 8 is a flowchart showing processing operations in the magnetic disk drive of the embodiment while the PLP is activated.

DETAILED DESCRIPTION

In general, according to one embodiment, a magnetic disk drive comprises a flash memory adopting a Serial NAND comprising a plurality of Blocks. The magnetic disk drive determines one or more first Blocks to be used for backup, among the plurality of Blocks, based on write time per each of the Blocks in the Serial NAND. The magnetic disk drive backs up data, which is stored in a nonvolatile memory, in the Serial NAND using counter electromotive force of a spindle motor.

First Embodiment

The present embodiment shows a magnetic disk drive comprising a PLP function adopting a Serial NAND. The PLP function is a function to back up unwritten data that are stored in a volatile memory such as DRAM to a nonvolatile memory in the magnetic disk drive at the time of power loss.

The present embodiment is an example of a magnetic disk drive that predicts a risk at which Bad Block, which cannot be used in the Serial NAND, occurs and avoids access to a Block involving high risk at the time of executing PLP. The present embodiment utilizes characteristic that the Block involves longer write time in the Serial NAND is more likely to become Bad Block.

Figure 1:
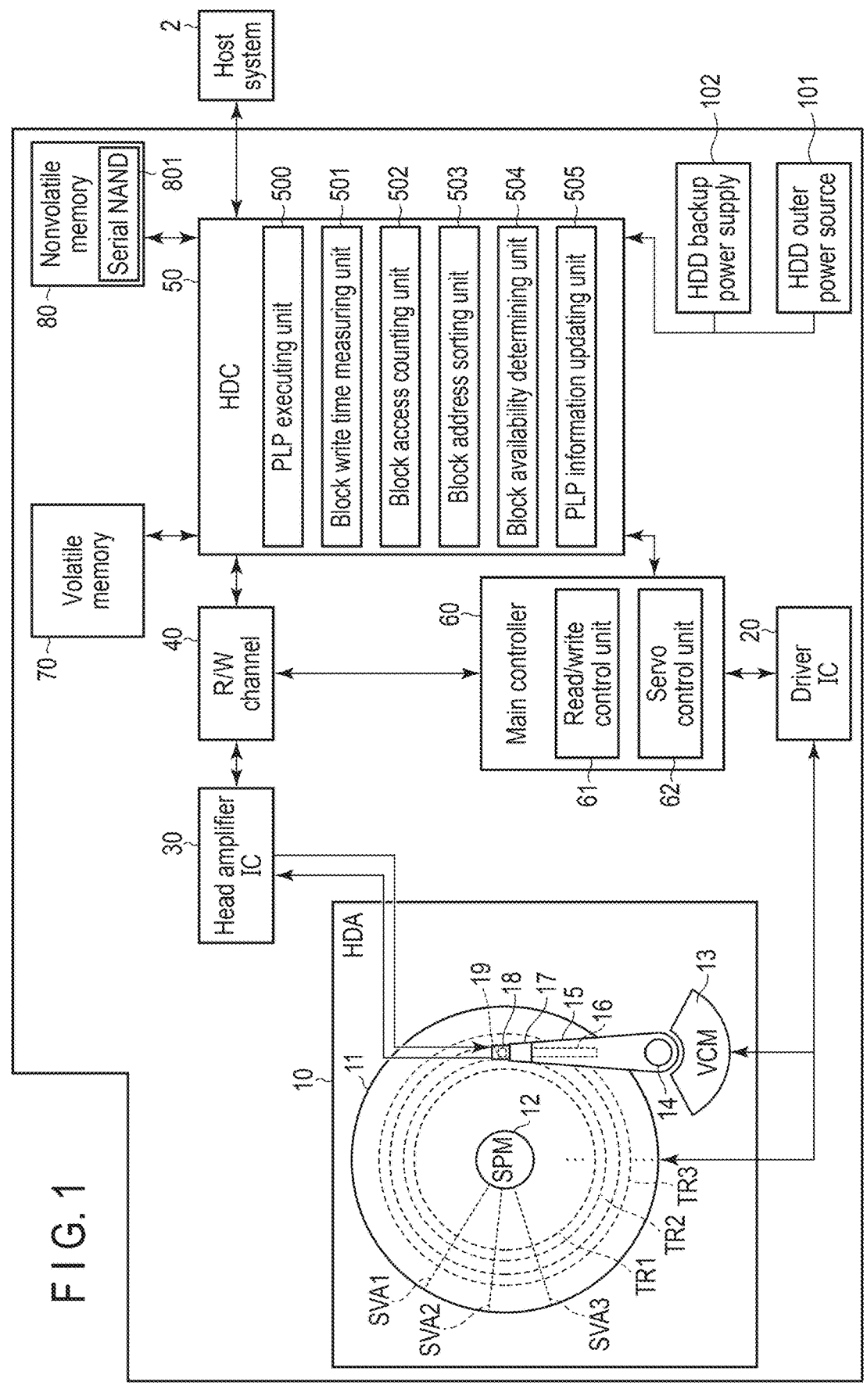
FIG. 1 shows a configuration of a magnetic disk drive of an embodiment.

FIG. 1 shows a configuration of a magnetic disk drive of an embodiment.

A magnetic disk drive 1 is a storage device comprising a magnetic disk 11 on which data is written and read (hereinafter simply referred to as a disk 11 in some cases). The magnetic disk drive 1 further comprises a processor having computing function such as arithmetic processing (for example, a processing unit such as a CPU and a microprocessor), and various types of memories. The magnetic disk drive 1 outputs data to a host system 2 and writes data input from the host system 2 into the disk 11 based on a command received from the host system 2 to which the disk drive 1 is connected and the like.

The magnetic disk drive 1 of the present embodiment adopts a system in which received data is temporally stored in a buffer memory before writing this data received from the host system 2 into the disk 11. The disk drive 1 uses, for example, a DRAM of a volatile memory 70 to be described later as the buffer memory. The method using the buffer memory increases data transmission speed from the host system 2 and the like and thus improves throughput of the magnetic disk drive 1.

The host system 2 is, for example, a PC body and outputs a read command, which is a read instruction of data of the disk 11, a write command, which is a write instruction of data and the like to the magnetic disk drive 1, together with data to be written into the disk. The host system 2 may output information on a sampling cycle of servo information, the information being included in the disk drive 11 of the magnetic disk drive 1, and may specify this output information for the magnetic disk drive 1.

A HDA 10 is referred to as a head-disk assembly and stores the magnetic disk 11, a spindle motor (hereinafter referred to as an SPM) 12, an arm 15 on which a head 19 is mounted, a voice coil motor (hereinafter referred to as a VCM) 13, and the like in a casing of the HDA 10. FIG. 1 shows a case where the HDA 10 includes one disk 11 and one head 19. However, the HDA 10 may include one or more disks 11 and one or more heads 19.

The disk 11 is a disk-type magnetic rotary disk storage medium, and a user data area available from a user and a system area in which information necessary for system management is written are allocated to a data area in which data can be written (also referred to as write). Hereinafter, the direction orthogonal to the radial direction of the disk 11 is referred to as a circumferential direction. The disk 11 is attached to the spindle motor 12 and rotates by driving of the spindle motor 12.

A plurality of tracks are set in the disk 11. In FIG. 1, three tracks TR1, TR2, and TR3 (when not particularly distinguished, any of these referred to as a track TR) are illustrated as an example, but a plurality of tracks are set concentrically around the spindle motor 12 in the data area. When read/write (reading/writing) of data of the disk 11 is executed, the head 19 is moved to the track TR on which data to be read/written (also referred to as target data) is present by seek control, tracking control, or the like, and the head 19 executes read/write of the data. The track TR having the target data may be referred to as a target track.

Furthermore, servo information is written in the disk 11, and is used for position detection of the head 19 and the like. The servo information is provided in a predetermined location (referred to as a servo area) in the circumferential direction of the disk 11. The servo information has general contents, and thus detailed description thereof will be omitted. In the example of FIG. 1, three servo areas SVA1, SVA2, and SVA3 (when not particularly distinguished, any of these is referred to as a servo area SVA) are illustrated as an example of the servo area, but in general, the servo areas SVAs are installed at equal intervals in the entire circumferential direction of the disk 11, and the servo information is written in the servo area SVA of each track TR. The magnetic disk drive 1 can detect the current position (head position) of the head 19 from the servo information read by the head 19.

The spindle motor 12 (SPM 12) is a support of the disk 11, and is installed in the casing of the magnetic disk or the like. When the spindle motor 12 rotates, the disk 11 rotates.

The VCM 13 is a voice coil motor type actuator, and is used to move the arm 15 and the like. The VCM 13 controls an operation of the arm 15 and the like based on an input current or voltage.

A pivot 14 is a bearing for supporting the arm 15 and the like and causing the arm to rotate or the like.

The arm 15 is an arm that supports a slider 18 and the head 19, transmits physical power from the VCM 13 to the head 19, and moves the head 19 to the target track TR.

A microactuator 17 is connected to a suspension 16.

The microactuator 17 (also referred to as MA 17) executes accurate position adjustment such as tracking control of the head 19 based on an input current or voltage. The microactuator 17 has a general function and thus detailed description thereof will not be described. The microactuator 17 executes fine adjustment of a position at the time of settling after seek control, and tracking control on the target track after seek control on the head 19. The settling is a time until a positioning error with respect to the target track falls within, for example, a certain threshold or less after the movement of the head 19 by the seek control, including the influence of the vibration of the head 19 by the seek control. After the vibration of the head 19 is sufficiently reduced by settling, data read/write control and tracking control are executed.

The head 19 is mounted on the slider 18.

The head 19 is a part that writes data to the disk 11 and reads data stored in a data track of the disk 11. In particular, in the case of distinction, the head that writes data to the disk 11 is referred to as a write head 19W, and the head that reads data stored in the data track of the disk 11 is referred to as a read head 19R.

A driver IC 20 outputs a current or a voltage for driving and controlling the SPM 12, the VCM 13, the MA 17, and the like according to control from the HDC 50, a servo control unit 62, and the like.

A head amplifier IC 30 includes a read amplifier and a write driver. The read amplifier amplifies a read signal read from the disk 11 and outputs this amplified read signal to an R/W channel 40. The write driver outputs, to the head 19, a write current corresponding to a signal output from the R/W channel 40.

The R/W channel 40 controls reading of data from the disk 11, writing of data to the disk 11, and the like with respect to the head amplifier IC 30 in response to an instruction from the HDC 50, a main controller 60, and the like. The R/W channel 40 receives a read data signal received from the head amplifier IC 30 and extracts read data, or generates a write data signal based on write data and the like instructed to write and outputs this write data signal to the head amplifier IC 30. Furthermore, the R/W channel 40 has a function of measuring the signal quality of the read data received from the head amplifier IC 30. The R/W channel 40 may extract position information of the head 19 based on a servo information signal received from the head amplifier IC 30.

The HDC 50 is an interface between the magnetic disk drive 1 and the host system 2, and is a hard disk controller that controls each part of the magnetic disk drive 1. The HDC 50 may include processing units (processors) having an arithmetic function such as a CPU, an IC chip comprising other computing functions and various types of memories, a system LSI, an FPGA, and the like. Various processing in the HDC 50 may be executed by a program of software (including firmware and the like), or may be provided as hardware, or a combination of software and hardware.

The HDC 50 receives commands from the host system 2, such as a command to write data to the disk 11 and a command to read data from the disk 11, for example. The HDC 50 controls each unit of the magnetic disk drive 1 and transmits data between the host system 2 and the R/W channel 40 based on the received command. The HDC 50 may control reading/writing of data from/to the volatile memory 70, a nonvolatile memory 80, and the like.

The HDC 50 comprises a PLP executing unit 500, a Block write time measuring unit 501, a Block access counting unit 502, a Block address sorting unit 503, a Block availability determining unit 504, and a PLP information updating unit 505. Functions of these units may be allocated to other units.

The PLP executing unit 500 is a unit of executing the PLP function. When the PLP executing unit 500 detects power loss of a HDD outer power source 101, the PLP executing unit 500 stores unwritten data, which is stored in a volatile memory such as DRAM, in a Serial NAND 801. The PLP executing unit 500 may execute PLP with reference to PLP information table generated separately.

The PLP executing unit 500 counts the execution count of the PLP function (hereinafter referred to as backup execution count). The backup execution count is indicative of the times that backup of data has been performed by the PLP function and is a value common to all of the Blocks.

The Block write time measuring unit 501 measures the write time in the Block in the serial NAND 801 (hereinafter referred to as Serial NAND write time). The Serial NAND write time is indicative of the write time of data to the Block and is a value measured per each of the Blocks. The Block write time measuring unit 501 may write test data to the Block to measure the write time to the Block, immediately after the magnetic disk drive 1 being powered on.

The Block access counting unit 502 counts the times that the write is performed per each of the Blocks in a state where the PLP function is activated (hereinafter referred to as the usage count in the backup). The usage count in the backup is indicative of the times that write of data has been executed by the PLP function, the value being determined per each of the Blocks.

Based on the Serial NAND write time, the usage count in the backup, and the like, the Block address sorting unit 503 determines the write order of Blocks to which write is to be performed at the time of executing the PLP function, sorts the physical address or logical address of the Blocks in the write order (sorting), and generates the write order and the sorted address as a Block address sorting result per the block.

More specifically, the Block address sorting unit 503 generates the Block address sorting result by executing address sort for the Blocks in ascending order in the write time using the Serial NAND write time measurement result. At the time of backup of the power loss of the HDD, the PLP executing unit 500 can write data to Blocks in the ascending order of the write time, by executing the write to the Blocks in accordance with the Block address sorting result.

In addition, based on the usage count in the backup, the Block address sorting unit 503 generates the Block address sorting result, for example, such that data is to be written in the Blocks in the ascending order of the access count for a plurality of Blocks having the same Serial NAND write time.

The Block address sorting unit 503 may remove, from a sorting target in the Block address sorting result, Blocks having write failure or Blocks whose NAND write time does not satisfy the write time standard of the device.

The Block availability determining unit 504 may put a label "unavailable" (NG) on Blocks having write failure such as test data being unable to write or Blocks whose measured write time does not satisfy the write time standard of the device, and may store these blocks in the PLP information table. For example, the PLP information table has Block availability status as a data item. This Block availability status is indicative of whether the Block is available (the first Block) or unavailable (the second Block) for the data write at the time of executing the PLP function ("OK" or "NG") and is determined per each of the Blocks. By the Block availability determining unit 504 identifying an unavailable Block address, write to the Block preliminarily identified as the Bad Block is avoided.

The Block availability determining unit 504 may consider the tendency that the Block having smaller usage count in the backup has a less write deterioration and thus use the usage count in the backup as an index for selecting the Block into which data is written at the time of PLP function and for determining the write order. For example, by the Block availability determining unit 504 selecting the Block having small write frequency as the Block to be used at the time of activating the PLP, access concentration to a specific Block can be avoided.

As described above, the PLP information updating unit 505 stores the data generated by the Block write time measuring unit 501, the Block access counting unit 502, the Block address sorting unit 503, and the Block availability determining unit 504 in the PLP information table, or updates this data.

The main controller 60 is a main controller controlling each part of the magnetic disk drive 1 and may be configured by, for example, a processor such as a CPU and a microprocessor, an IC chip having other computing functions and various types of memories, a system LSI, an FPGA, and the like. Various processing of the main controller 60 may be executed by a program of software (including firmware and the like), or may be provided as hardware, or a combination of software and hardware.

Based on the command received from the host system 2 and the like, a read/write control unit 61 selects a storage destination of write data (for example, information such as a data sector and a track of the disk 11), and controls a write operation of data to the disk 11. Based on the command received from the host system 2 and the like, the read/write control unit 61 notifies a servo control unit 62 and the like of a storage destination (for example, information such as a data sector and a track of the disk 11) of read data, and controls a read operation of data of the disk 11 by operating the head 19.

The servo control unit 62 controls the head 19, for example, based on the command received from the host system 2 and the like. For example, the servo control unit 62 executes seek control and tracking control to control the VCM 13 via the driver IC 20 in order to move the head 19 to a target position. Furthermore, the servo control unit 62 controls the MA 17 via the driver IC 20 to execute tracking control of the head 19.

The volatile memory 70 is a semiconductor memory whose stored data is lost when power supply is lost. The volatile memory 70 stores data and the like necessary for processing in the magnetic disk drive 1. The volatile memory 70 is, for example, a dynamic random access memory (DRAM) or a synchronous dynamic random access memory (SDRAM).

The nonvolatile memory 80 is a semiconductor memory that records stored data even when power supply is lost. The nonvolatile memory 80 may include, for example, a NOR flash memory or a NAND flash memory. The Serial NAND 801 is a Serial NAND flash memory.

The HDD outer power source 101 is an outer power source of the magnetic disk drive 1 and obtains alternating-current power from outside and supplies inside parts with power of 5V, 12V, and the like.

The HDD backup power supply 102 may be an internal power source for the HDD outer power source 101. The HDD backup power source 102 is supplied with power of 5V, 12V, and the like by the HDD outer power source 101 and supplies each inside part in the magnetic disk drive 1 with power. For example, when unpredicted power loss occurs in the HDD outer power source 101, the HDD backup power source 102 can continue power supply function using counter electromotive force of the spindle motor 12.

When unpredicted power loss occurs in the HDD outer power source 101, the HDC 50 activates the PLP, and backs up unwritten data that are stored in the volatile memory 70 such as the DRAM in the Serial NAND 801 using the power supplied by the HDD backup power source 102 using counter electromotive force of the spindle motor 12.

FIG. 2 is a timing chart illustrating an example of operations in PLP function of the magnetic disk drive of the present embodiment. In FIG. 2, horizontal axis direction is indicative of time direction and longitudinal axis direction is indicative of amplitude of a voltage, a current, a power, and the like. A1 to A4 show examples of amplitude property of a voltage, a current, a power, and the like. Reference numerals to which "t" is added are indicative of the time common to the properties A1 to A4.

It is assumed that the HDD outer power source 101, the HDD backup power source 102 properly operate in ON (power on) state in time to. It is assumed that power loss occurs in the HDD outer power source 101 in time t01. It is assumed that the HDD outer power source 101 is OFF (suspended) in time t1.

In the time t1, power supply from the HDD outer power source 101 to the HDD backup power source 102 is suspended. As the property A2 indicates, after the HDD backup source 102 supplying power for a while, power supply is continued using the counter electromotive force of the spindle motor 12. Around the time t2, the property A2 decreases as the rotation speed of the spindle motor 12 decreases. When it reaches the time t3, the HDD backup power source 102 is OFF (suspended) and power supply is suspended. Therefore, the PLP has to be completed within a certain time after the HDD power loss.

A Bad Block execution (corresponding to a replacement processing to be described later) at the time of executing PLP involves concerns such as decrease in the backup data size due to PLP time loss and error in the backup function itself due to the Bad Block. That is because the magnetic disk drive has the fail safe function to decrease the PLP time (data backup available time) according to an increase in the number of Bad Blocks. Therefore, it is preferable that the access to Bad Block in the PLP function is avoided.

When the HDC 50 detects the power loss of the HDD outer power source 101 in the time t1, the HDC 50 activates the PLP function and backs up unwritten data that are stored in the volatile memory 70 in the Serial NAND 801 while the power supplied by the HDD backup power source 102 is sufficient. The property A3 shows an example of time in which the data backup by the PLP function is possible (time t11 to t23). The property A4 shows an example of time in which write of data to the Serial NAND 801 is performed (time t12 to t21).

The data written to the Serial NAND 801 at the time of power loss is to be read next time that the magnetic disk drive 1 is powered on and is to be stored in the disk 11. After the completion of the processing, the data stored in the Serial NAND 801 may be invalidated.

FIG. 3 is a schematic view illustrating data configuration of the volatile memory (Serial NAND) in the magnetic disk drive of the present embodiment.

As shown in the figures, largely, a write area of the Serial NAND 801 may be logically divided into the system information area and the user data area. The system information area to be described later is an area in which the PLP information table is stored. The user data area is an area in which data to be moved from the volatile memory 70 is stored by the PLP function and thus is referred to as a PLP area as well.

Generally, the minimum unit of the Serial NAND is a Block including a plurality of cells (one-bit area) and, write to one cell requires rewrite of the entire Block including that cell. Figures show an example in which 1024 Blocks are allocated to the PLP area (commonly, an actual product has an area that stores firmware information and parameter information and thus cannot be rewritten, among 1024 Blocks. Therefore, not all of the 1024 Blocks are the PLP area). When being constituted by cell of 128 KB, each Block has capacity of 128 MB.

The PLP information table related to the PLP function of the present embodiment is stored in the system information area. The backup execution count is indicative of the times that backup of data has been performed by the PLP function and is a value common to all of the Blocks. The measurement result of the Serial NAND write time is indicative of the write time of data to the Block in the PLP area and is a value measured per each of the Blocks. The Block address sorting result is indicative of the write order of the Blocks to which data write is executed at the time of activating the PLP function and is a value determined per each of the Blocks. The Block availability status is indicative whether the Block can be used for data write at the time of activating the PLP function and is information determined per each of the Blocks. The usage count in the backup is indicative of the times that write of data has been executed by the PLP function, the value being determined per each of the Blocks.

Operations of the magnetic disk drive of the embodiment will be described below.

FIG. 4 is a flowchart indicative of processing operation of the magnetic disk drive of the embodiment. For example, the processing operation may be an instruction or processing procedure included in the software (including firmware) stored in the nonvolatile memory 80 and the like.

When the HDD outer power source 101 is ON (Yes in step S101), the HDC 50 reads the PLP information table (step S102).

The HDC 50 checks the backup execution count in the PLP information table. When the backup execution count is 0, in other words, data has not been written in the PLP area (Yes in step S103), or when the backup execution count is 100n (n is natural number) (Yes in step S104), the procedure proceeds to step S105.

The condition in step S104: "the backup execution count is 100n" is based on the result of the experiment indicative of that increase in write count to the Block of the Serial NAND becomes observable when the write to the Block of the Serial NAND becomes around one hundred times. The present embodiment describes the example in which, every time the backup execution count reaches one hundred times, the write to the Serial NAND is performed again and the write time is updated. This number is not limited to one hundred times but may be a parameter which can be freely changed.

The processing from steps S105 to S112 is performed for each Block in the PLP information table. A case of the i-th (where i is an integer from 0 to 1023) Block #i in the PLP area (backup data size area+spare area) will be described below as an example.

Test data is written to the Block #i (step S106). Write of test data may be setting 1 for all of the cells in the Block. The Serial NAND 801 performs write in units of Blocks. Write of data to the Block #i is completed by supplying charge, in other words, writing data to all of the cells included in the Block #i.

In the write processing of the step S106, the HDC 50 measures the write time for the Block #i (step S107). In the step S107, the write time can be measured by measuring the timestamps of starting write and completing write. The measured time may be written into the PLP information table at the time of the measurement being completed.

A Block that involves the write failure or has a write time longer than the device standard is considered as unavailable and is skipped. For example, when the HDC 50 detects the write failure for the Block #i in the write processing in the step S106 or detects that the write time for the Block #i does not satisfy the standard in the processing in the step S107, the HDC 50 determines that the Block #i is unavailable (NG) (Yes in step S108 and the procedure proceeding to step S109). In contrast, when the condition in the step S108 is not satisfied, the Block #i is determined as available (OK) (No in step 108 and the procedure proceeding to step S110).

In the steps S109 and S110, the HDC 50 updates the item "Block availability" for the Block #i in the PLP information table to "OK" or "NG" (step S111). The HDC 50 executes the processing from the steps S105 to S112 for all of the Blocks in the PLP area and determines the write order for each Block using this updated PLP information table (step S113).

FIG. 5A is an example of the PLP information table for the Serial NAND in the magnetic disk drive in the present embodiment where the backup execution count is 0. The example shown in FIG. 5A corresponds to the example of the PLP information table updated after Yes in the step S103 in FIG. 4.

Each column is indicative of data for the Original Block address, the backup execution count, the Serial NAND write time, the write ascending address sort, the Block availability, and the backup execution count. Each row is indicative of data for each item for the Block specified by the Original Block address. The Original Block address is indicative of the address identifying the Block in the PLP area. For the sake of illustration, the Original Block address is assumed to indicate the logical addresses such as #0, #1, #2, and the like, in the physical order of the Blocks in the PLP area of the Serial NAND 801, as shown in FIG. 3. Furthermore, #0, #1, and #2 do not necessarily have to be physically or logically adjacent to one another.

Data D3 is indicative of data writing time to the Block measured in the above step S106 in FIG. 4. Data 5 is indicative of the availability of the data write to the Block, which has been determined in the step S108. Data D4 is indicative of the Block address sorting result determined based on Data D3 and D5 and is the result of executing the step S113.

For example, data BD1 is an example where the HDC 50 executes the processing from the steps S105 to S110 for the Original Block address "Block #1" and determines that the data write time is d [ms], that the Block availability is "OK", and that the Block address sort result is 5th by the processing in the step S113.

In the step S113, the HDC 50 may determine the Block address sort result based on the Serial NAND write time and the Block availability. For example, the ascending order of the Serial NAND write time may be determined as the write order. In this case, for example, as in the case shown in BD2 and BD3, Blocks that have "NG" as the Block availability status based on reasons that the Serial NAND write time thereof do not satisfy the standard or the write to the Serial NAND 801 cannot be performed (write failure), and the like may be excluded from the write target.

Data D4 is an example where the write order is determined in the ascending order of the Serial NAND write time for the Block having "OK" as the Block availability status based on the process of the step S113. In the case where two blocks have the same Serial NAND write time as the examples of the Block #0 and the Block #2, the write order may be the order from the Block #0 to the Block #2 based on the predetermined ascending order of the Blocks.

FIG. 5B shows an example of the PLP information table of the Serial NAND included in the magnetic disk drive of the present embodiment in a case where the backup has been executed. FIG. 5B corresponds to an example of the PLP information table that has been updated after No in the step S103 in FIG. 4.

Data D2 indicates that 500 backups (write to the Serial NAND 801 using the PLP function) were performed in the past. In addition, as shown in data D6, the usage count in the past backups is indicated per each of the Blocks.

In that case, in the processing in the step S113, the usage count in the backup is used in addition to the Serial NAND write time and the Block availability. In the second and subsequent PLP, a block having smaller access count (usage count in the backup) is preferentially used, among Blocks having the same Serial NAND write time. This is achieved, for example, by the Block access counting unit 502 of the HDC 50 counting the used frequency of the Block (usage count in the backup) and storing the usage count in the backup in the PLP information table to monitor.

More specifically, as shown in data BD11 and BD12, when two Blocks have the same Serial NAND write time such as "e [ms]", the Block #6, which has the smaller usage count in the backup may be executed first and then the Block #1 may be executed.

The case where the write order is determined based on the usage count in the backup is described in the above example. The Block to be used for backup may be determined based on the usage count in the backup. For example, a threshold value is set for the usage count in the backup, and the Block exceeding the threshold value may be excluded from the write target. Specifically, when the threshold value is set to 250 in the example of FIG. 5B, the Block #1 and the Block #4 are excluded from the write target.

Figure 6:
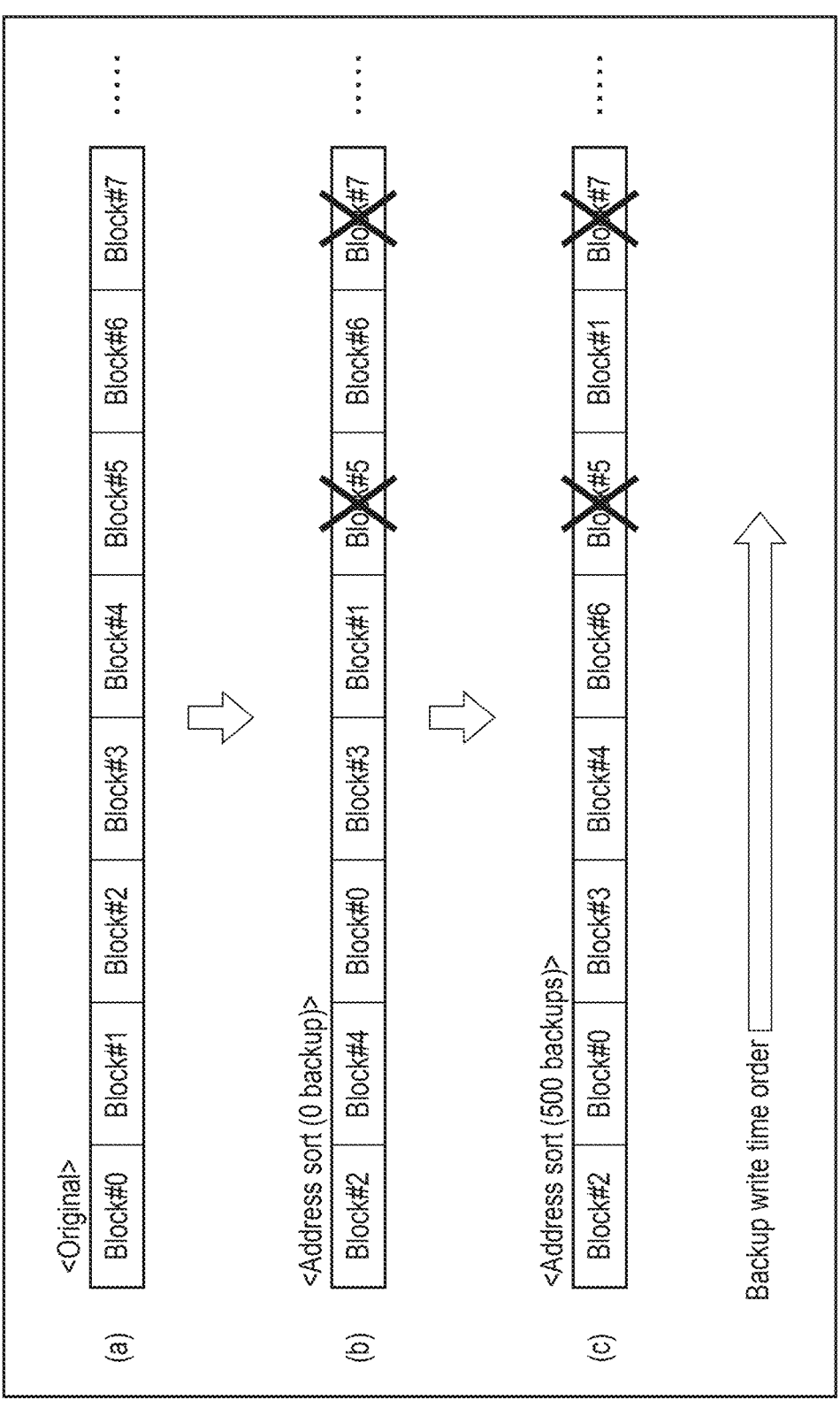
FIG. 6 is an imaginary view of an address in a case where the magnetic disk drive of the present embodiment sorts Blocks in ascending order of write time.

FIG. 6 is an imaginary view of an address in a case where the magnetic disk drive of the present embodiment sorts Blocks in ascending order of write time.

FIG. 6 (*a*) shows a case where the Blocks are sorted in the order in the Original Block address shown in Data D1 in FIG. 5. FIG. 6 (*b*) shows a case where the Blocks are sorted in the write order of the Block in the case of the backup having not been performed (corresponding to the case shown in FIG. 5A). FIG. 6 (*c*) shows a case where the Blocks are sorted in the write order of the Block in the case of the backup having been performed (corresponding to the case shown in FIG. 5B). FIG. 6 (*b*) and FIG. 6 (*c*) show that the Block #5 and the Block #7 are considered to have "NG" as the Block availability, are sorted in the ascending order of the write time, and are excluded from the write target. FIG. 5 shows the write order per each of the Blocks as the address sort shown in D4. However, as shown in the address sort in FIG. 6 (*b*) and FIG. 6 (*c*), the addresses may be sorted in the write order to be included in the PLP information table. Thus, write to the Blocks are executed in the order of the address sort while the PLP is activated.

FIG. 7 is a schematic view illustrating the Serial NAND in a case where NG occurs in write into Blocks in the Serial NAND in the magnetic disk drive of the present embodiment.

In general, unlike Serial NOR, Serial NAND requires users to guarantee Blocks that involve write failures (Bad Blocks). More specifically, in the device standard, 2% of the capacity of the product (corresponding to the capacity of the PLP area) requires care by users. For example, in the case of the product having 128 MB, the number of the Blocks of the entire capacity is 1024, and 20 Blocks, corresponding to 2% of the entire capacity, requires a replacement processing to alternative Blocks (Bad Block processing).

FIG. 7 (*a*) shows an example where the Original Block address is specified for the physical blocks in the Serial NAND 801 and indicates that the Block #50 involves a failure. FIG. 7 (*b*) shows the logical address situation after the Bad Block processing has been executed for the Block #50 involving the failure. As a result of the Bad Block processing, the Original Block address of the Block #50 is moved to the position of the Block #1023. The Block #1023 is preliminarily prepared as a spare Block for the Bad Block processing.

When the PLP information table is updated in the processing in the step S114, the magnetic disk drive 1 becomes normal use state (Ready state for the HDD power loss). If HDD power loss occurs in the Ready state for the HDD power loss, the HDC 50 executes data backup by referring to the PLP information table and executes the write to the Blocks in the ascending order of the write time in the Serial NAND 801.

The following describes the processing operation in a case where the PLP function is activated in response to unexpected power loss in the magnetic disk drive 1 in the Ready state for the HDD power loss.

FIG. 8 is a flowchart showing processing operations in the magnetic disk drive of the embodiment while the PLP is activated.

When the HDC 50 detects a power loss in the HDD outer power source 101, the HDC 50 activates the PLP function and reads the address sort in the PLP information table (Yes in step S201 and the procedure proceeding to step S202). According to the read address sort, the HDC 50 writes unwritten data that are stored in the volatile memory 70 to the Serial NAND 801 per each of the Blocks in order (step S203). After completion of the write processing for one Block (hereinafter referred to as the Block #i), the HDC 50 increases the usage count in the backup for the Block #i by 1 and updates the PLP information table (step S204). After the step S204, if the address sort has a next Block (Yes in step S205), the processing from the step S203 is repeated. Once the backup processing for all of the Blocks in the address sort is completed (No in step S205), the processing is terminated.

By the above procedure, the magnetic disk drive of the present embodiment can reduce accesses (write) to the blocks that are likely to become Bad Blocks at the time of write to the Serial NAND using the PLP function. Thus, in addition to the reduction in the time loss in the backup time due to the processing time for the Bad Blocks, which occurs when the Serial NAND is adopted, the increase in the reliability of the backup data of the PLP function and reduction in the backup processing time can be expected. In addition, by monitoring the use frequency of the Block using the Block access counting function, the concentration of access to the same Block can be controlled, and the wear leveling effect (distribution of used Block addresses) can also be expected.

According to at least one of the embodiments described above, a magnetic disk drive executing data backup using the PLP function for a flash memory that adopts the Serial NAND can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. In addition, the processing shown in flowcharts, sequence charts, and the like may be executed as instructions or procedures for operating computers, and the like by including them in hardware such as software (including firmware), IC chips, or digital signal processors (DSPs), or by combining them with hardware and software. In addition, even if a claim is expressed as control logic, a program including an instruction to urge a computer to be executed, or a computer-readable storage medium storing the instruction, the device of the embodiments is applied to the claim. Furthermore, the names and terms used are not limited, and other expressions are also included in the present invention if they are substantially identical in content and purpose.

What is claimed is:

1. A magnetic disk drive, comprising: a flash memory adopting a Serial NAND that includes a plurality of Blocks, wherein the magnetic disk drive backs up data in a volatile memory to the Serial NAND using a counter electromotive force of a spindle motor and determines one or more first Blocks to be used for write at backup, among the plurality of Blocks, based on a write time per the Block in the Serial NAND, determines a write order at backup to the one or more first Blocks based on the write time, and preliminarily sorts addresses of the first Blocks in the write order and stores the sorted addresses in the serial NAND.

2. The magnetic disk drive of claim 1, wherein the magnetic disk drive measures the write time.

3. The magnetic disk drive of claim 1, wherein the magnetic disk drive identifies a second Block of the plurality of Blocks, which is unavailable, as distinct from the first Block.

4. The magnetic disk drive of claim 3, wherein the second Block is unavailable when the second Block has a write failure or when the write time of the second Block exceeds a write time standard of the magnetic disk drive.

5. The magnetic disk drive of claim 3, wherein the write order is an order in which write to the first Blocks is executed in an ascending order of a write frequency.

6. The magnetic disk drive of claim 5, wherein the magnetic disk drive counts the write frequency of the first Block.

7. A magnetic disk drive comprising:
a flash memory adopting a Serial NAND that includes a plurality of Blocks; and
a PLP information table including a backup execution count, a Block write time measurement result in the Serial NAND, a result of executing address sort for the Blocks in an ascending order of the write time, a Block availability result, and a write frequency (usage count of the Block), wherein the magnetic disk drive backs up data in a volatile memory to the Serial NAND using a counter electromotive force of a spindle motor and determines one or more first Blocks to be used for write at backup, among the plurality of Blocks, based on a write time per the Block in the Serial NAND.

8. The magnetic disk drive of claim 7, wherein the magnetic disk drive determines whether the PLP information table is to be updated or not based on the backup execution count.

* * * * *